United States Patent [19]

Walker

[11] Patent Number: 5,247,962

[45] Date of Patent: Sep. 28, 1993

[54] SWIVEL CONNECTOR FOR GAS SERVICE DEVICES IN MODULAR GAS SERVICES UNIT

[75] Inventor: James A. Walker, Oklahoma City, Okla.

[73] Assignee: Gaddis-Walker Electric, Inc., Oklahoma City, Okla.

[21] Appl. No.: 4,356

[22] Filed: Jan. 14, 1993

[51] Int. Cl.⁵ .................................................. F16L 5/00
[52] U.S. Cl. .................................... 137/360; 137/615; 285/64
[58] Field of Search ....................... 137/360, 361, 615; 248/476; 285/61, 64

[56] References Cited

U.S. PATENT DOCUMENTS

| | | | |
|---|---|---|---|
| 2,649,314 | 8/1953 | Richardson | 285/91 |
| 3,840,264 | 10/1974 | Bennett | 285/98 |
| 3,858,910 | 1/1975 | Oetiker | 285/84 |
| 3,884,258 | 5/1975 | Mull | 137/360 X |
| 3,990,727 | 11/1976 | Gallagher | 285/26 |
| 4,498,693 | 2/1985 | Schindele | 285/137 |
| 4,647,079 | 3/1987 | Ohlsson | 285/276 |
| 4,683,905 | 8/1987 | Vigneau et al. | 137/329.1 |
| 4,807,659 | 2/1989 | Schindele | 137/360 |
| 4,821,470 | 4/1989 | Kappers et al. | 52/36 |
| 4,844,116 | 7/1989 | Buehler et al. | 137/360 |
| 5,014,693 | 5/1991 | Wright, II et al. | 128/204.18 |
| 5,060,425 | 10/1991 | Kappers et al. | 52/36 |
| 5,062,420 | 11/1991 | Levine | 128/204.18 |

OTHER PUBLICATIONS

Ohmeda Company fittings and adapters brochure (not dated).
1989 Compressed Gas Association specifications for DISS connector for oxygen.
Modular Services Company of Oklahoma City, Okla., brochure for The Hidden Wall, first published in 1991.
Stryker/Adel OMNIWALL brochure (copyright notice Nov. 1990).
Hill-Rom Company, Inc., brochure for First Impression brand head assembly (not dated).

*Primary Examiner*—Martin P. Schwadron
*Assistant Examiner*—Kevin L. Lee
*Attorney, Agent, or Firm*—Dunlap, Codding & Lee

[57] ABSTRACT

A modular gas services outlet unit for providing gas related services, such as compressed air, oxygen and vacuum, to a health care facility. The unit is enclosed within a shell which may be mounted on a surface or installed in a recess in a wall. Preferably, each of the gas service devices utilized in the unit is supported by a swivel connector assembly which allows the gas service device to be moved between an operating position in which the device extends a distance outside the shell and a storage position in which the device is contained entirely within the shell. In this way, when the gas service is not required the fully assembled gas service device can be rotated to the storage position inside the shell. In most instances the unit will include a cover which is slidably mounted over the shell for concealing the unit when none of the gas services are in use. When use of a gas service device is required, the cover is repositioned to permit access to the unit and the swivel connector allows the device to be moved immediately into the operating position with little or no assembly.

23 Claims, 3 Drawing Sheets

SWIVEL CONNECTOR FOR GAS SERVICE DEVICES IN MODULAR GAS SERVICES UNIT

FIELD OF THE INVENTION

The present invention relates generally to modular gas services units and devices for connecting services therein.

SUMMARY OF THE INVENTION

The present invention is directed to a modular gas services unit for installation in a recess in a wall. The unit comprises a shell for enclosing the devices for dispensing the gas services, and the shell is adapted to be received in the recess in the wall. The shell has a first surface perpendicular to the wall and a second surface parallel to the first surface and spaced a distance therefrom. A service outlet is mounted in the first surface, and the service outlet is adapted for connection to a gas supply accessed through the wall and to receive a gas conduit adapter.

The modular gas services unit further comprises a swivel connector assembly for supporting a gas service device in the unit for movement between an operating position in which the device extends a distance outside the shell and a storage position in which the device is contained entirely within the shell. The connector assembly comprises a first conduit member with a body having a first end and a second end and a gas conduit extending through the body from the first end to the second end. The first end is adapted to connect to a gas conduit adapter. The assembly also includes a second conduit member having a body, a first end and a second end and having a gas conduit extending a distance into the body from the first end. The first end of the second conduit member is rotatably connectable to the second end of the first conduit member. A portion of the body defines a port continuous with the gas conduit and adapted for connection to a gas service device for providing gas from the gas supply to the gas service device.

The present invention also is directed to a swivel connector assembly for supporting a gas service device between a first surface having a gas outlet therein for providing a connection to a supply of gas, and a second surface parallel to the first surface. The swivel connector assembly comprises a first conduit member with a body having a first end and a second end and a gas conduit extending through the body from the first end to the second end. The first end is adapted to connect to a gas conduit adapter connected to the gas outlet in the first surface.

The assembly further includes a second conduit member having a body, a first end and a second end and having a gas conduit extending a distance into the body from the first end. The first end of the second conduit member is rotatably connectable to the second end of the first conduit member. A portion of the body defines a port continuous with the gas conduit and adapted for connection to a gas service device for providing gas from a gas supply to the gas service device. Still further, the assembly includes a base member for supporting the first and second conduit members and means for movably securing the base to the second surface.

Still further, the present invention includes a modular gas services unit comprising a shell for enclosing devices which dispense gas services. In this embodiment the shell may be mounted on a surface or within a recess formed in the surface. The shell has a first surface and a second surface parallel to the first surface and spaced a distance therefrom. A gas service outlet is mounted in the first surface, and the gas service outlet is adapted for connection to a gas supply accessed through the wall. The outlet further is adapted to receive a gas conduit adapter.

The unit further comprises a swivel connector assembly for supporting a gas service device for movement between an operating position in which the gas service device extends a distance outside the shell and a storage position in which the gas service device is contained entirely within the shell. The swivel connector assembly comprises a first conduit member with a body having a first end and a second end. A gas conduit extends through the body from the first end to the second end. The first end is adapted to connect to a gas conduit adapter. The assembly has a second conduit member with a body and a first end and a second end. A gas conduit extends a distance into the body from the first end, and the first end of the second conduit member is rotatably connectable to the second end of the first conduit member. A portion of the body defines a port continuous with the gas conduit and is adapted for connection to a gas service device for providing gas from the gas supply to the gas service device.

DETAILED DESCRIPTION OF THE PREFERRED EMBODIMENTS

In health care facilities such as hospitals, clinics and convalescent centers, it is essential that suction and certain medical gases, including compressed air and oxygen, be immediately available in the event of a medical emergency. However, the equipment and devices necessary to provide these gas-related services are frightening to most patients. Therefore, it is desirable to conceal or disguise such devices to render the atmosphere in the health care facility less stressful and more conducive to successful treatment and recovery.

To this end, modular gas services units are available for providing gas-related and other services and equipment. Many of these modular units are designed to be installed in or on one of the walls in the facility so that the nature of the services available in these units can be concealed or disguised. One such unit is marketed under the brand name "The Hidden Wall" by Modular Services Corporation of Oklahoma City, Okla. Also popular are modular units which are surface mounted, that is, installed on the surface of a wall or other vertical surface, or which are contained within furniture cabinets.

Certain of the gas service devices, such as vacuum control units and flow meters commonly used for dispensing oxygen and compressed air, are quite large when assembled using conventional equipment and extend as much as ten to twelve inches from the surface in which the service outlet is connected. Consequently, a relatively deep recess is required to totally contain such devices in their operational positions. As many building-standard walls are less than five inches thick, many such gas service devices cannot be contained entirely in modular units designed to be installed in recesses formed in such walls. As a result, in such units, the flow meters and other gas service devices must be disassembled and the dispensing mechanisms stored separately when the services are not in use. In the event of an emergency, the dispensing devices must be retrieved from storage and re-assembled for use.

The present invention is directed to a modular gas services unit employing a swivel connector assembly for attaching the gas service devices to the service outlets in the unit. The swivel connector assembly allows the devices to be rotated between a storage position in which they are totally contained within the recess and an operating position in which they extend out into the room. The unit preferably includes a cover such as a piece of framed art which is slidably mounted over the unit to conceal the gas service devices when they are not in use. When the need for the services arises, the cover is repositioned to permit access to the unit and the gas service devices are rotated into the operating position without the need for assembly. Thus, the danger from separating and storing the devices in a remote location is obviated. Yet, the fully assembled gas service devices can be contained in a relatively shallow recess. These and other advantages will be apparent from the following description of the preferred embodiment of the present invention.

Figure 1:
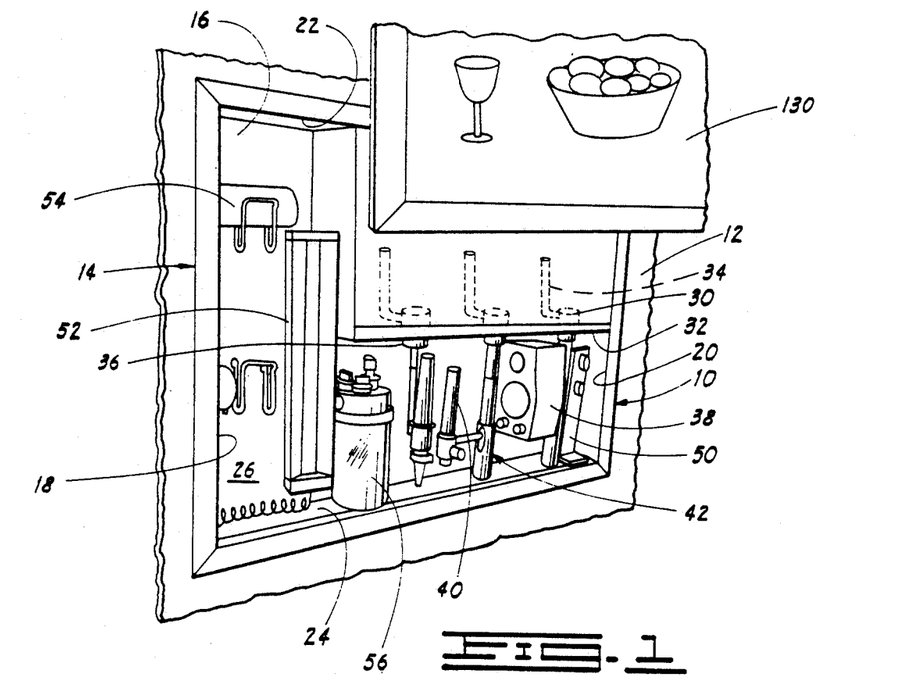
FIG. 1 is a perspective view of a wall-recessed modular gas services unit constructed in accordance with the present invention. The service devices are in the storage position.

With reference now to the drawings in general and to FIG. 1 in particular, there is shown therein and designated by the reference numeral 10 a modular gas services unit constructed in accordance with the present invention. The unit 10 preferably is adapted for installation in a recess in the wall 12 of a medical facility, as shown in FIG. 1. However, as will become apparent, the unit 10 may be surface mounted on the wall or any other vertical structural surface. For purposes of this description, the term "wall" is intended to encompass all such surfaces.

The unit 10 is housed in a shell 14 which comprises a back wall 16, a first side wall 18, a second side wall 20, a top wall 22 and a bottom wall 24 which together define a recess 26. As shown, the top wall 22 and the bottom wall 24 are parallel to each other and perpendicular to the wall.

At least one gas service outlet 30 (shown in broken lines) is mounted in the unit 10 in a known manner. In the embodiment shown, the surface 32 is provided for supporting the outlet 30. The surface 32 is parallel to and spaced a distance from the bottom wall 24. The service outlet 30 is adapted for connection to a gas supply accessed by conduits 34 (also in broken lines) through the wall which are in turn connected to a supply of gas. As used herein, the term "gas" or "medical gas" denotes compressed air, oxygen and vacuum, as well as any other gaseous substance or service that may be selected for use in a medical facility. The outlet 30 is adapted to receive a standard gas conduit adapter 36.

In the preferred embodiment shown in the drawings herein, the unit 10 is installed in a building-standard wall which is about $4\frac{5}{8}$ inches thick. Thus, in this embodiment, the depth of the recess 26 will be slightly less than $4\frac{5}{8}$ inches.

Various devices are necessary for dispensing or otherwise utilizing the medical gases supplied by the unit 10. For example, a control box 38 is necessary to control and monitor the negative pressure administered from a suction or vacuum supply. A flow meter 40 is necessary to administer oxygen. These and other conventional devices are referred to herein generally as "gas service devices."

Figure 2:
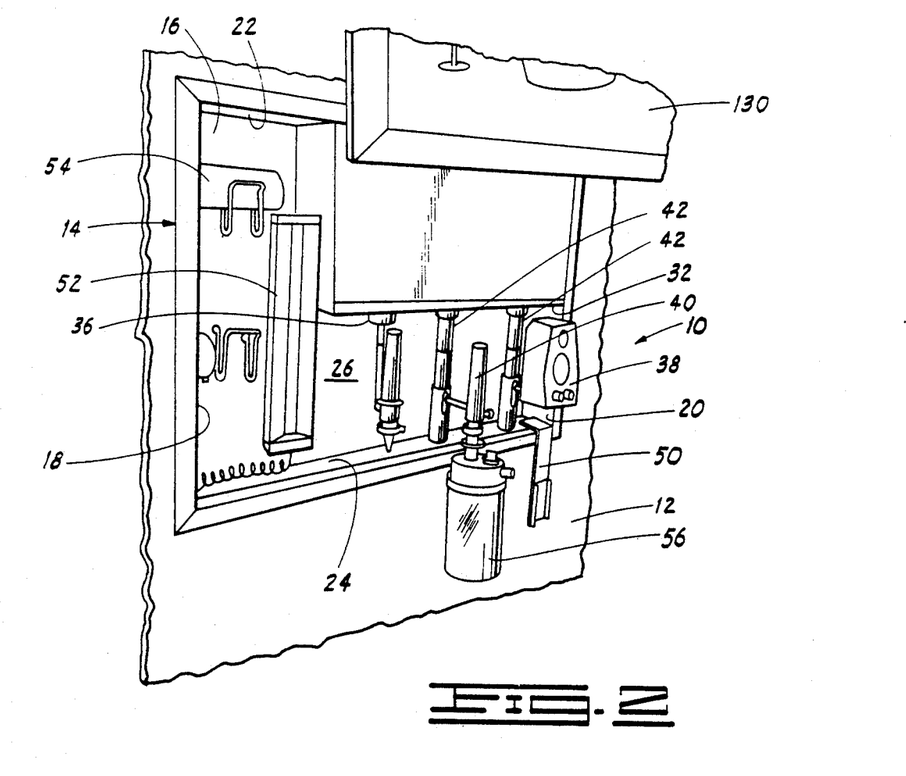
FIG. 2 is a perspective view of the modular gas services unit shown in FIG. 1 with the gas service devices in the operating position.

To allow the assembled gas service device 40 to be rotated between a storage position in which the device is contained within the recess 26, as shown in FIG. 1, and an operating position as shown in FIG. 2, the present invention includes at least one swivel connector assembly 42 for rotatably supporting the gas service devices, such as the control box 38 and flow meter 40, in the recess 26. In the preferred embodiment, two or more swivel connector assemblies will be provided. However, as their construction is identical, they will be referred to herein collectively by the reference numeral 42, and only one will be described in detail.

As shown in FIG. 1, the swivel connector assembly 42 of this invention permits the flow meter 40 and control box 38 to be rotated to and stored in a sidewise position. In this position the devices 38 and 40 are contained entirely in the recess 26.

As depicted in FIG. 2, the swivel connector assembly 42 also permits the gas service devices 38 and 40 to be rotated out into the room into their fully operational arrangement. At this point it will be noted that the shell 14 is adapted to contain various other auxiliary medical equipment. For example, a bracket 50 is pivotally attached to the bottom wall 24 so that it may be flipped out quickly to support a suction container of some sort. A sphygmomanometer 52 and blood pressure cuff 54 may be mounted in a suitable fashion. Further, a humidifier 56 may be stored in the recess 26 until oxygen is needed and then connected to the flow meter 40 when it is swiveled out of the recess into its operating position. Of course, these are only exemplary of a wide variety of equipment and devices that may be stored in the modular gas services unit 10 of this invention.

Figure 3:
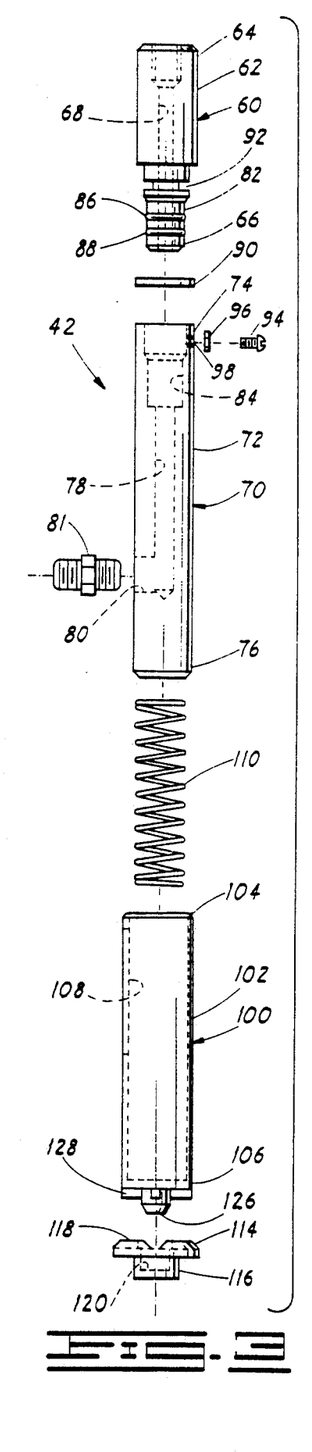
FIG. 3 is a side elevational exploded view of the swivel connector assembly utilized to mount the gas service devices.
Figure 4:
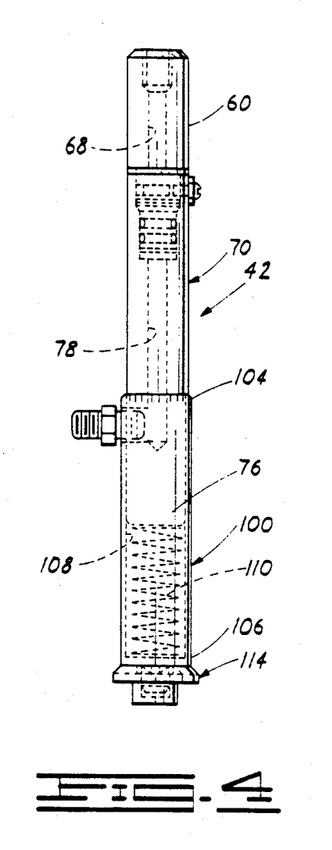
FIG. 4 is a side elevational view of the swivel connector assembly, shown in FIG. 3, fully assembled.
Figure 5:
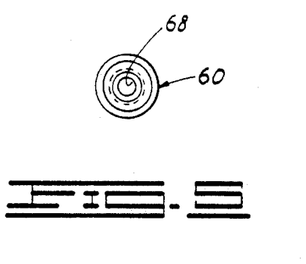
FIG. 5 is a plan view of the first conduit member of the swivel connector assembly shown in FIG. 4.
Figures 9, 10, 11, 12:
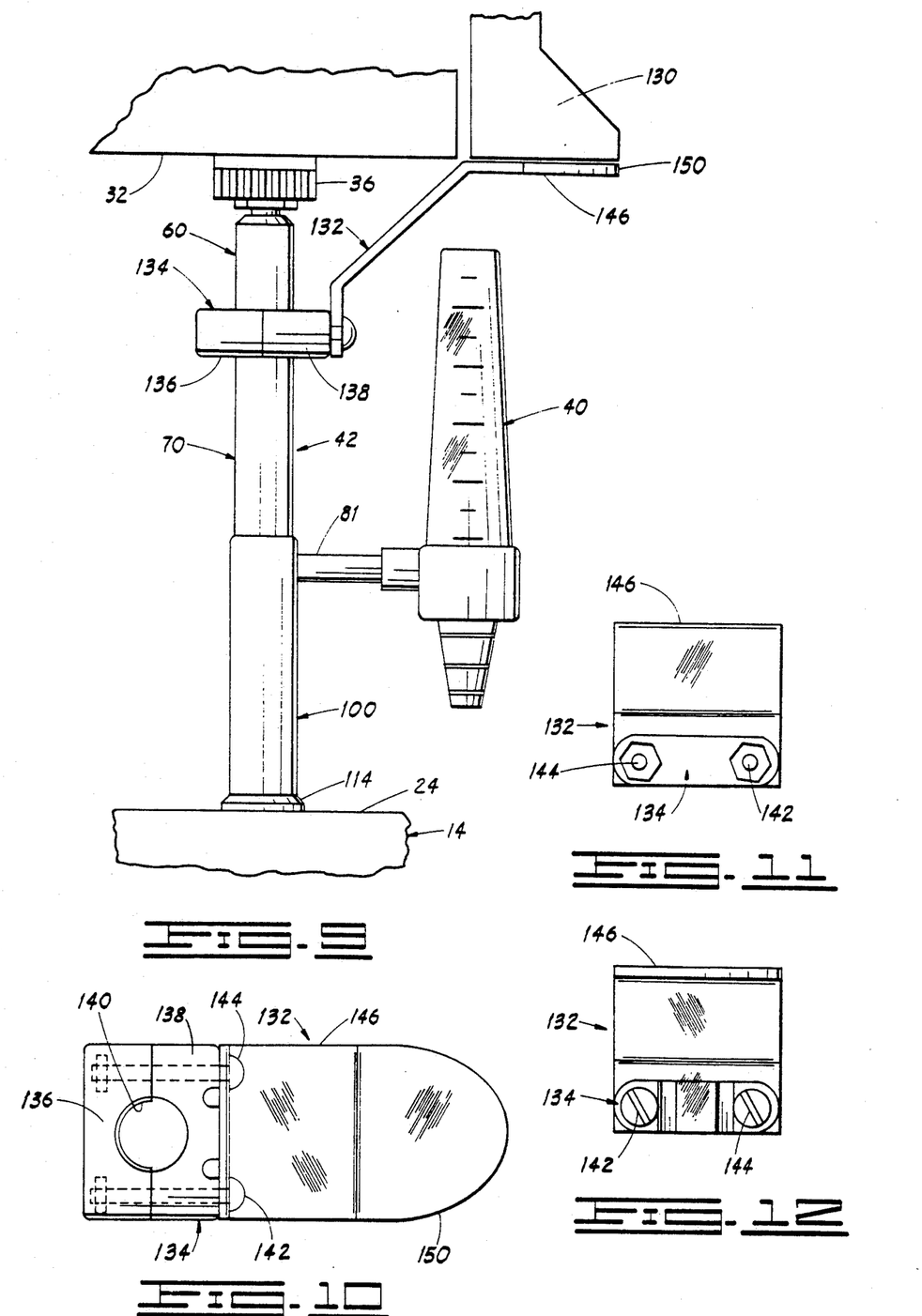
FIG. 9 is a side view of a swivel connector assembly in accordance with the present invention including a guard for protecting the gas service device.
FIG. 10 is a plan view of the guard device shown in FIG. 9.
FIG. 11 is a back view of the guard device shown in FIG. 9.
FIG. 12 is a front view of the guard device shown in FIG. 9.

Turning now to FIGS. 3 and 4, the swivel connector assembly 42 will be described in detail. The assembly 42 comprises a first conduit member 60 having a body 62 with a first end 64 and a second end 66. A gas conduit 68 (see also FIG. 5) extends through the body 62 from the first end 64 to the second end 66, and the first end 64 is adapted to connect to the adapter 36 (FIGS. 1, 2 and 9).

A second conduit 70 member is included in the assembly. The second conduit member 70 comprises a body 72 having a first end 74 and a second end 76. A gas conduit 78 extends a distance into the body 72 from the first end 74. A port 80 extends from the gas conduit 78 through the side of the body 72. The port 80 is adapted to connect to a gas service device so that gas may be supplied from the source to the device through the gas conduits 68 and 78 in the first and second conduit members 60 and 70. In most instances, the port 80 will be threaded to receive an adaptor 81 of some sort which in turn connects to the device such as the flow meter 40.

Referring still to FIGS. 3 and 4, the first end 74 of the second conduit member 70 is rotatably connectable to the second end 66 of the first conduit member 60. To this end, the second end 66 of the first conduit 60 forms a male member 82 which engages a female portion 84 defined by the gas conduit 78 in the first end 74 of the second conduit 70. To provide a seal, the male member 82 may be provided with at least one and preferably two grooves and O-rings 86 and 88. The interface between the first end 74 of the second conduit member 70 and the second end 64 of the first conduit member 60 may be provided with a washer 90.

To prevent inadvertent disconnection of the first end 74 of the second conduit member 70 and the second end 64 of the first conduit member 60, the male member 82 is provided with an annular groove 92. The first end 74 of the second conduit member 70 is equipped with a set screw 94 which is threadedly received in a bore 98 which intersects the female portion 84 of the gas conduit 78. A washer 96 may be included. Thus, the set screw 94 will prevent withdrawal of the male member 82 from the female portion 84.

With continuing reference to FIGS. 3 and 4, the swivel connector assembly 42 also preferably includes a base member 100 for supporting the first and second conduit members 60 and 70 and for stabilizing them in their proper vertical position between the upper surface 32 and the opposing bottom wall 24 in the recess 26.

In its preferred form, the base member 100 is a tube having a body 102 with an open upper end 104 and a closed lower end 106. The lumen or inner space 108 of the tubular body 102 is sized to telescopically receive the second end 76 of the second conduit member 70. A resilient member such as a compression spring 110 is positioned in the inner space 108 between the second end 76 of the second conduit member 70 and the second end 106 of the base member 100.

Figure 6:
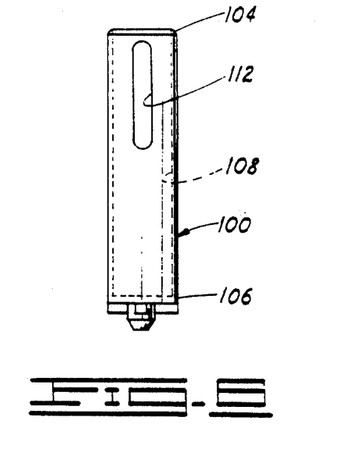
FIG. 6 is a side elevational view of the base member of the swivel connector assembly shown in FIG. 4.

As shown in FIG. 6, a slot 112 is formed in the side of the body 102 of the base member 100. When assembled as in FIG. 4, the adapter 81 extends through the slot 112 and allows the base member 100 to move up and down on the second conduit member 70 while preventing inadvertent disconnection of the second conduit member and the base member.

Figure 7:
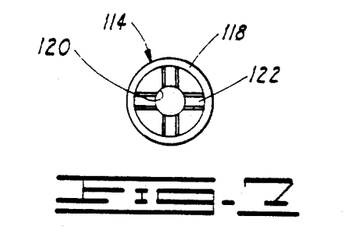
FIG. 7 is a plan view of the grommet for supporting the lower end of the swivel connector assembly shown in FIG. 4.

Referring again to FIGS. 3 and 4, the second end 106 of the base member 100 is securable to the bottom wall 24. For this purpose, the swivel connector assembly 42 includes a grommet 114 which is secured to the bottom wall 24 of the shell 14 (see also FIG. 9). The grommet 114 includes a stem portion 116 which is mounted in the bottom wall 24 of the shell 14 in some suitable fashion. Atop the stem portion 116 is a collar portion 118. As best seen in FIGS. 3 and 7, the collar 118 defines a recess 120 which extends a distance down into the stem portion 116. Extending radially from the recess 120 is a plurality of shallow grooves 122. The depth of the recess 120 is greater than the depth of the grooves 122.

Figure 8:
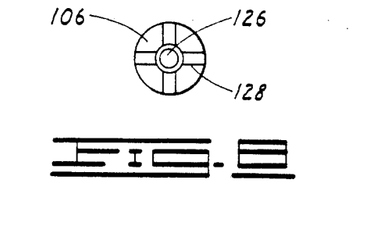
FIG. 8 is a bottom view of the lower end of the base member of the swivel connector assembly shown in FIG. 4.

As seen in FIG. 3 and also in FIG. 8, the base member 100 is provided with a nose 126 sized to be received in and mate with the recess 120. Similarly, as shown in FIG. 3 and also in FIG. 8, the second end 106 of the base member 100 includes ridges 128 which extend radially from the nose 126, the nose extending a distance beyond the ridges.

Now the operation of the connector assembly 42 will be apparent. The nose 126 at the second end 106 of the base member 100 pivots or rotates in the recess 120 of the grommet 114 when the base member is lifted slightly up on the second conduit member 70 so that the ridges 128 clear the grooves 122 in the grommet. In this position, the base member 100 will rotate freely. The interlocking action of the ridges 128 and the grooves 122 provides several locking positions for the base member 100 and, therefore, the gas service device such as a flow meter 40 connected to the second conduit member 70.

For example, one locking position is shown in FIG. 1 wherein the base member 100 and second conduit 70 are positioned so that the flow meter 40 is sidewise. A second position is shown in FIG. 2 wherein the base member 100 and the second conduit member 70 are extending out into the room beyond the wall 12.

Now it will be appreciated that in most instances it will be desirable to provide the unit 10 with a cover, such a the framed art 130 shown in FIGS. 1 and 2 (see also FIG. 9). The picture 130 then can be used to totally conceal the existence of the unit 10 in a wall or to disguise a surface mounted unit when the gas service devices are in the storage position.

The picture 130 may be mounted by hinges or slidably connected to the unit 10 so that it can be moved between a first position in which the shell 14 is covered and a second position in which the shell 14 is uncovered partially to permit access to the services therein. To utilize the gas service devices supported in the shell 14, the picture 130 is repositioned to permit access to the shell. Then, the devices are swiveled out into the operating position, as previously described.

It will be understood that in the event the picture 130 should be lowered while the flow meter 40 is in the operating position, the cover will impact the flow meter 40 possibly causing inadvertent disconnection or damage to the device. To prevent this, the swivel connector assembly 42 may be provided with a guard 132 as shown in FIGS. 9 through 11 to which attention now is directed.

In the preferred practice of the invention, the guard 132 comprises a brace 134 having two mating portions 136 and 138 which together form a ring 140 which can grippingly engage the second conduit member 70 of the swivel connector assembly 42 thereby securing the guard 132 to the assembly. The two portions 136 and 138 are secured together by screws 142 and 144

The guard further comprises an arm 146 formed of some suitable material such as plastic or aluminum. The ar 146 is secured to the brace 134 is some suitable way. In the embodiment shown, the arm 146 is secured to the brace 134 by the screws 142 and 144 which connect the two portions 136 and 138 of brace 134.

As shown in FIG. 9, the free end 150 of the arm 146 extends out from the swivel connector assembly 42 and over the top of the flow meter 40. Thus, if the cover 130 should slide down towards the flow meter 40, the movement of the cover 130 will be halted by the arm 146 before the cover impacts the flow meter.

Changes may be made in the combination and arrangement of the various parts, elements, steps and procedures described herein without departing from the spirit and scope of the invention as defined in the following claims.

I claim:

1. A modular gas services unit for installation in a recess in a wall, wherein the unit comprises:
    a shell for enclosing devices which dispense gas services, wherein the shell is adapted to be received in the recess in the wall, and wherein the shell has a first surface perpendicular to the wall and a second surface parallel to the first surface and spaced a distance therefrom;
    a service outlet mounted in the first surface, wherein the service outlet is adapted for connection to a gas supply accessed through the wall and further adapted to receive a gas conduit adapter; and
    a swivel connector assembly for supporting a gas service device for movement between an operating position in which the gas service device extends a distance outside the shell and a storage position in which the gas service device is contained entirely within the shell, wherein the swivel connector assembly comprises:
        a first conduit member with a body having a first end and a second end and a gas conduit extending through the body from the first end to the second end, wherein the first end is adapted to connect to a gas conduit adapter;
        a second conduit member having a body and a first end and a second end and having a gas conduit extending a distance into the body from the first end, wherein the first end of the second conduit member is rotatably connectable to the second end of the first conduit member, wherein a portion of the body defines a port continuous with the gas conduit and adapted for connection to a gas service device for providing gas from the gas supply to the gas service device; and
        means for providing a gas-tight seal between the first and second conduit member.

2. The modular services unit of claim 1 wherein the swivel connector assembly further comprises:
    a base member for supporting the first and second conduit members; and
    means for movably securing the base to the second surface in the shell.

3. The modular services unit of claim 2 wherein the base member is a tube having a body which defines an inner space, a first end and a second end, wherein the first end is open and continuous with the inner space in the body so that the body is adapted for telescopically receiving the second end of the second conduit member, and wherein the second end of the tube is securable to the second surface.

4. The modular services unit of claim 3 wherein the swivel connector assembly further comprises a resilient member receivable in the inner space of the body of the base so that when assembled and installed in the shell, the resilient member is partially compressed between the second conduit member and the base member.

5. The modular services unit of claim 4 wherein the resilient member is a compression spring.

6. The modular services unit of claim 4 wherein a slot is formed in the side of the base member continuous with the inner space in the body of the base member and permitting access to the port in the body of the second conduit member when the second end of the second conduit member is received in the base member and further permitting the base member to be moved up and down a distance on the second conduit member without covering the port.

7. The modular services unit of claim 6 wherein the means for securing the second end of the base member to the second surface includes a nose extending from the second end of the base member and a plurality of ridges extending radially from the nose, the nose extending further from the second end of the base member than the ridges, and wherein the securing means further includes a grommet affixed to the second surface, the grommet having a recess for receiving the nose and a plurality of grooves extending radially from the recess for receiving the ridges, the recess having a depth greater than the depth of the grooves, so that when the ridges of the base member are received in the grooves of the grommet the base member cannot be rotated in the grommet, and so that when the base member is moved up a distance on the second conduit member, compressing the resilient member and lifting the ridges above the grooves, the base member can be rotated in the grommet.

8. The modular services unit of claim 1 further comprising:
    a cover movably attached to the shell for movement between a first position in which the shell is covered and a second position in which the shell is uncovered; and
    a guard secured to the swivel connector assembly for protecting the gas service device from injury in the event the cover is moved from the second to the first position while the gas service device is in the operating position.

9. A swivel connector assembly for supporting a gas service device between a first surface having a gas outlet therein for providing a connection to a supply of gas, and a second surface parallel to the first surface, wherein the connector assembly comprises:
    a first conduit member with a body having a first end and a second end and a gas conduit extending through the body from the first end to the second end, wherein the first end is adapted to connect to a gas conduit adapter connected to the gas outlet in the first surface;
    a second conduit member having a body, a first end and a second end and having a gas conduit extending a distance into the body from the first end, wherein the first end of the second conduit member is rotatably connectable to the second end of the first conduit member, wherein a portion of the body defines a port continuous with the gas conduit and adapted for connection to a gas service device for providing gas from the gas supply to the gas service device;
    means for providing a gas-tight seal between the first and second conduit member;
    a base member for supporting the first and second conduit members; and
    means for movably securing the base to the second surface.

10. The swivel connector assembly of claim 9 wherein the base member is a tube having a body which defines an inner space, a first end and a second end, wherein the first end is open and continuous with the inner space in the body so that the body is adapted for telescopically receiving the second end of the second conduit member, and wherein the second end of the tube is securable to the second surface.

11. The swivel connector assembly of claim 10 further comprising a resilient member receivable in the inner space of the body of the base between the second end of the base member and the second end of the second conduit member.

12. The swivel connector assembly of claim 11 wherein the resilient member is a compression spring.

13. The swivel connector assembly of claim 11 wherein a slot is formed in the side of the base member continuous with the inner space in the body of the base member and permitting access to the port in the body of the second conduit member when the second end of the second conduit member is received in the base member and further permitting the base member to be moved up and down a distance on the second conduit member to compress and release the resilient member but without covering the port.

14. The swivel connector assembly of claim 13 wherein the means for securing the second end of the base member to the second surface includes a nose extending from the second end of the base member and a plurality of ridges extending radially from the nose, the nose extending further from the second end of the base member than the ridges, and wherein the securing means further includes a grommet affixed to the second surface, the grommet having a recess for receiving the nose and a plurality of grooves extending radially from the recess for receiving the ridges, the recess having a depth greater than the depth of the grooves, so that when the ridges of the base member are received in the grooves of the grommet the base member cannot be rotated in the grommet, and so that when the base member is moved up a distance on the second conduit member, compressing the resilient member and lifting the ridges above the grooves, the base member can be rotated in the grommet.

15. The swivel connector assembly of claim 8 further comprising:
 a guard secured to the swivel connector assembly for protecting the gas service device from injury from objects moving near the wall while the gas service device is in the operating position.

16. A modular gas services unit comprising:
 a shell for enclosing devices which dispense gas services, wherein the shell has a first surface wall and a second surface parallel to the first surface and spaced distance therefrom;
 a gas service outlet mounted in the first surface, wherein the gas service outlet is adapted for connection to a gas supply accessed through the wall and further adapted to receive a gas conduit adapter; and
 a swivel connector assembly for supporting a gas service device for movement between an operating position in which the gas service device extends a distance outside the shell and a storage position in which the gas service device is contained entirely within the shell, wherein the swivel connector assembly comprises:
  a first conduit member with a body having a first end and a second end and a gas conduit extending through the body from the first end to the second end, wherein the first end is adapted to connect to a gas conduit adapter;
  a second conduit member having a body and a first end and a second end and having a gas conduit extending a distance into the body from the first end, wherein the first end of the second conduit member is rotatably connectable to the second end of the first conduit member, wherein a portion of the body defines a port continuous with the gas conduit and adapted for connection to a gas service device for providing gas from the gas supply to the gas service device; and
 means for providing a gas-tight seal between the first and second conduit member.

17. The modular services unit of claim 16 wherein the swivel connector assembly further comprises:
 a base member for supporting the first and second conduit members; and
 means for movably securing the base to the second surface in the shell.

18. The modular services unit of claim 17 wherein the base member is a tube having a body which defines an inner space, a first end and a second end, wherein the first end is open and continuous with the inner space in the body so that the body is adapted for telescopically receiving the second end of the second conduit member, and wherein the second end of the tube is securable to the second surface.

19. The modular services unit of claim 18 wherein the swivel connector assembly further comprises a resilient member receivable in the inner space of the body of the base so that when assembled and installed in the shell, the resilient member is partially compressed between the second conduit member and the base member.

20. The modular services unit of claim 19 wherein the resilient member is a compression spring.

21. The modular services unit of claim 19 wherein a slot is formed in the side of the base member continuous with the inner space in the body of the base member and permitting access to the port in the body of the second conduit member when the second end of the second conduit member is received in the base member and further permitting the base member to be moved up and down a distance on the second conduit member without covering the port.

22. The modular services unit of claim 21 wherein the means for securing the second end of the base member to the second surface includes a nose extending from the second end of the base member and a plurality of ridges extending radially from the nose, the nose extending further from the second end of the base member than the ridges, and wherein the securing means further includes a grommet affixed to the second surface, the grommet having a recess for receiving the nose and a plurality of grooves extending radially from the recess for receiving the ridges, the recess having a depth greater than the depth of the grooves, so that when the ridges of the base member are received in the grooves of the grommet the base member cannot be rotated in the grommet, and so that when the base member is moved up a distance on the second conduit member, compressing the resilient member and lifting the ridges above the grooves, the base member can be rotated in the grommet.

23. The modular services unit of claim 16 further comprising:
 a cover movably attached to the shell for movement between a first position in which the shell is covered and a second position in which the shell is uncovered; and a guard secured to the swivel connector assembly for protecting the gas service device from injury in the event the cover is moved from the second to the first position while the gas service device is in the operating position.

* * * * *

UNITED STATES PATENT AND TRADEMARK OFFICE
CERTIFICATE OF CORRECTION

PATENT NO. : 5,247,962
DATED : September 28, 1993
INVENTOR(S) : Walker

It is certified that error appears in the above-indentified patent and that said Letters Patent is hereby corrected as shown below:

Column 6, line 24, before the numeral "70" please insert the word -- member --.

Column 6, line 62, the word "ar" should be -- arm --.

Column 9, line 53, before the word "distance" please insert the word -- a --.

Signed and Sealed this

Seventeenth Day of May, 1994

Attest:

BRUCE LEHMAN

Attesting Officer

Commissioner of Patents and Trademarks